(12) United States Patent
Allam

(10) Patent No.: US 8,652,223 B2
(45) Date of Patent: Feb. 18, 2014

(54) COMBINED SYNTHESIS GAS GENERATOR

(75) Inventor: Rodney J. Allam, Chippenham (GB)

(73) Assignee: GTLpetrol LLC, New York, NY (US)

(*) Notice: Subject to any disclaimer, the term of this patent is extended or adjusted under 35 U.S.C. 154(b) by 719 days.

(21) Appl. No.: 12/569,694

(22) Filed: Sep. 29, 2009

(65) Prior Publication Data

US 2010/0086451 A1    Apr. 8, 2010

Related U.S. Application Data

(60) Provisional application No. 61/101,138, filed on Sep. 29, 2008.

(51) Int. Cl.
*B01J 7/00* (2006.01)
*C10J 3/08* (2006.01)

(52) U.S. Cl.
USPC ............... 48/61; 48/62 R; 422/625; 422/198

(58) Field of Classification Search
USPC .................................... 48/61, 197 R
See application file for complete search history.

(56) References Cited

U.S. PATENT DOCUMENTS

| | | | |
|---|---|---|---|
| 4,650,651 A * | 3/1987 | Fuderer | 422/628 |
| 4,741,885 A | 5/1988 | Herbort et al. | |
| 4,822,521 A | 4/1989 | Fuderer | |
| 2002/0155061 A1 * | 10/2002 | Prasad et al. | 423/652 |
| 2004/0018144 A1 * | 1/2004 | Briscoe | 423/652 |
| 2004/0047777 A1 | 3/2004 | Pettit et al. | |
| 2005/0173495 A1 * | 8/2005 | Wastiaux et al. | 228/208 |
| 2007/0000176 A1 | 1/2007 | Liu et al. | |

FOREIGN PATENT DOCUMENTS

| | | |
|---|---|---|
| CN | 87100591 | 7/1988 |
| EP | 0 841 301 A1 | 5/1998 |
| JP | 09-067582 A | 3/1997 |
| WO | WO2007/134727 A1 | 11/2007 |

OTHER PUBLICATIONS

International Preliminary Report on Patentability issued in international application No. PCT/US2009/058769, mailed Apr. 7, 2011, 6 pages.
International Search Report and Written Opinion of the International Searching Authority issued in international application No. PCT/US2009/058769, May 3, 2010, 11 pages.
European Search Report issued in EP application No. 09817033.5, mailed Mar. 13, 2013, 7 pages.
Office Action and Search Report issued in Chinese Application No. 200980139122.6 on Apr. 12, 2013; 16 pages.

* cited by examiner

*Primary Examiner* — Matthew Merkling
(74) *Attorney, Agent, or Firm* — Fish & Richardson P.C.

(57) ABSTRACT

In various systems and processes, synthesis gas generation may be combined. A partial oxidation reactor (POX) and a gas convectively heated steam/hydrocarbon catalytic reformer (GHR) may be combined to produce synthesis gas. In some implementations, a partial oxidation reactor, a gas convectively heated steam/catalytic reformer, and a waste hat boiler may be combined to produce synthesis gas.

15 Claims, 5 Drawing Sheets

COMBINED SYNTHESIS GAS GENERATOR

PRIORITY CLAIM OF PRIORITY

This application claims priority under 35 USC §119(e) to U.S. Patent Application Ser. No. 61/101,138, filed on Sep. 29, 2008, the entire contents of which are hereby incorporated by reference.

TECHNICAL FIELD

The present invention relates to combined synthesis gas generators.

BACKGROUND

Currently, when producing synthesis gas containing carbon monoxide and hydrogen, a hydrocarbon feed and oxygen and optionally steam is provided to a partial oxidation reactor, and the product of the partial oxidation reactor and/or a portion of the feed stream are then provided to a catalytic reformer. Optionally heat is recovered to raise steam in a separate unit. High pressure and high temperature piping connect the various reactors, which also include separate foundations or separate support structures.

SUMMARY

In various implementations, a combined synthesis gas generation system may be provided. The combined synthesis gas generation system may include a two-stage reactor that includes a partial oxidation reactor and a catalytic reformer. The two-stage reactor may be configured to reduce zones of little or insignificant mixing (e.g., optimum mixing) between gases produced during the synthesis gas generation processes. In some implementations, the combined synthesis gas generation system may include a three-stage system that includes a partial oxidation reactor, a catalytic gas reformer, and a waste heat boiler.

The details of one or more implementations are set forth in the accompanying drawings and the description below. Other features, objects, and advantages of the implementations will be apparent from the description and drawings.

DESCRIPTION OF DRAWINGS

Like reference symbols in the various drawings indicate like elements.

DETAILED DESCRIPTION

Figure 1:
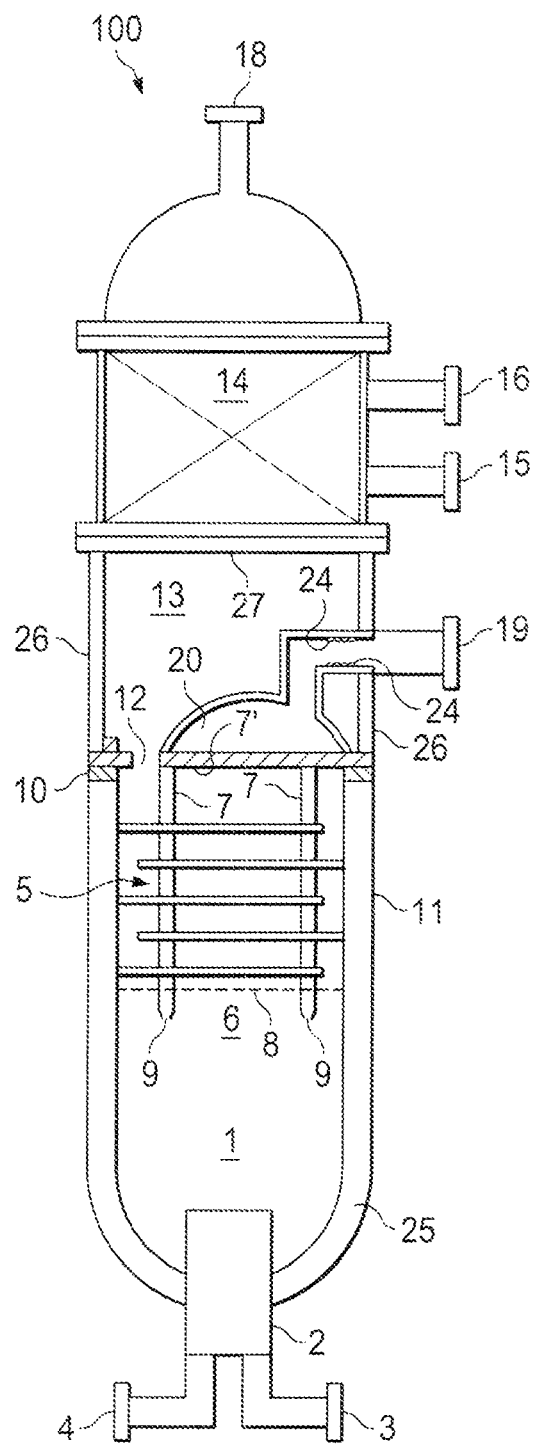
FIG. 1 illustrates an example combined synthesis gas generation system.

In various implementations, a feed stream is processed to produce synthesis gas (e.g., streams including hydrogen and carbon monoxide) streams. The processed feed streams may include a variety of feed streams that include methane, such as natural gas, hydrocarbon fuels, methane rich gases such as coalbed methane or biogas (e.g., stream produced from the anaerobic decay of matter). The feed streams may include liquid or gaseous hydrocarbons, such as natural gas and liquefied petroleum gas and distillates.

The combined synthesis gas generation system may integrate a partial oxidation reactor (POX) and a gas heated catalytic reformer (GHR) (e.g., a convectively heated steam/hydrocarbon catalytic reformer) such that the synthesis gas produced by the POX is mixed with the synthesis gas from the GHR. The combined stream may be used to heat the GHR (e.g., since the synthesis gas produced by the POX and the GHR may have a temperature sufficient to heat the feed entering the GHR and/or steam entering the GHR and provide the endothermic heat of reaction required to covert the steam and hydrocarbon feed in the GHR to produce synthesis gas). Optionally the feed gases to the POX and/or the GHR may include a stream of CO2 to produce a required CO to H2 ratio in the combined synthesis gas generation stream.

The combined stream, that includes synthesis gas, may leave the shell side of the GHR cooled and be further cooled in a waste heat boiler (WHB). In three-stage synthesis gas generation systems, the WHB may be an integrated stage of the synthesis gas generation system. In two-stage synthesis gas generation systems, the WHB may be a separate reactor. The heat from the combined stream leaving the shell side of the GHR may heat boiler feed water to produce steam to be utilized by the POX and/or the GHR. The steam may be produced by the WHB at a pressure sufficiently high to allow the steam to be mixed with the hydrocarbon fuel for the GHR and/or the POX. In some implementations, the resulting steam and feed stream may be further pre-heated by an external means.

Conventionally, the POX, GHR, and WHB are built as three separate units, for example, separate pressure vessels linked by pipes and located in a support structure. The general arrangement requires expensive internally insulated piping and/or high alloy steel piping, and associated supports, etc. A combined synthesis gas generation system may reduce costs (e.g., since less expensive piping may be used and since connections between previously separate units may be eliminated) while maintaining the process and operating and maintenance and safety features desired in a synthesis gas generation system. Another feature of a single reactor unit for the sequential operations of partial oxidation, auto-thermal reforming and optionally waste heat recovery, is to generate steam internally so that the synthesis gas stream passes through the composite unit without requiring the synthesis gas to pass through any piping connection between the units.

Figure 2:
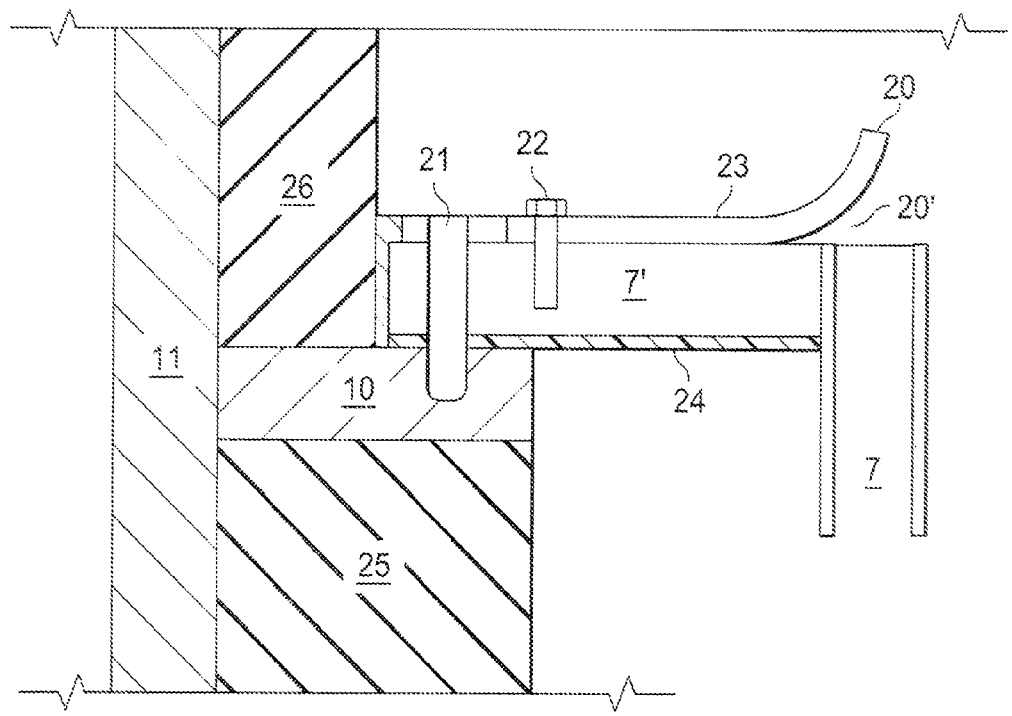
FIG. 2 illustrates a portion of the example combined synthesis gas generation system illustrated in FIG. 1.
Figure 3:
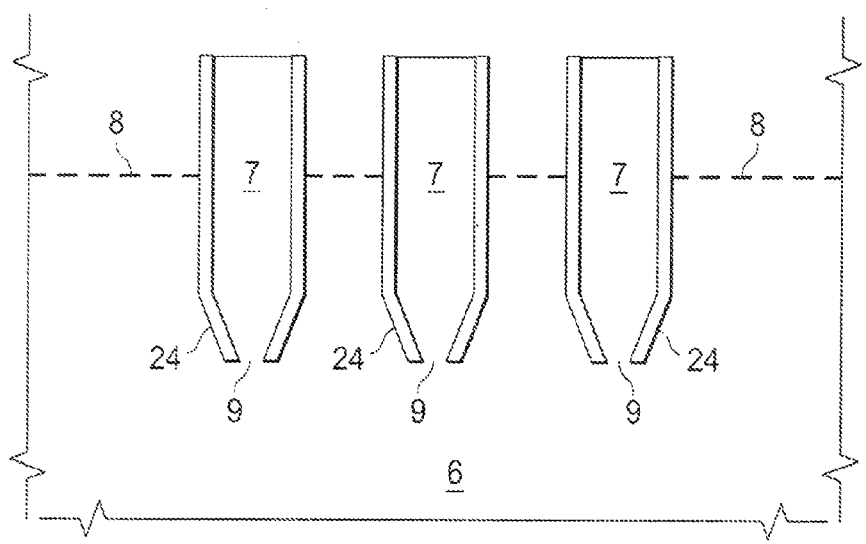
FIG. 3 illustrates another portion of the example combined synthesis gas generation system illustrated in FIG. 1.

FIG. 1 illustrates an example synthesis gas generation system 100 and FIGS. 2 and 3 illustrate portions of the synthesis gas generation system 100. The synthesis gas generation system 100 illustrated is a three-stage synthesis gas generation system in which the POX stage 1, GHR stage 5, and WHB stage 14 are arranged vertically. A vertical arrangement may decrease the footprint required for the combined synthesis gas generation system when compared with conventional combined gas generation systems and/or conventional separate unit gas generation systems. Reducing the footprint of the system may be more cost-effective (e.g., reduce land requirements), allow the system to be positioned in reduced footprint environments, and/or allow the combined synthesis gas generation system (e.g., together with other components of the overall process) to be fabricated as a single module of compact dimensions and minimum weight.

As illustrated, the POX stage 1 is positioned proximate the bottom of the synthesis gas generation system 100. The WHB stage 14 is positioned proximate the top of the synthesis gas generation system 100 and the GHR stage 5 is positioned between the WHB stage and the POX stage. The POX stage 1 may include a POX burner assembly 2 that includes a feed inlet 3 and another inlet 4. An oxygen stream and/or a steam stream may be provided to the POX stage 1 through the other inlet 4. The burners of the burner assembly 2 may be configured to inhibit zones of little or insignificant mixing in the POX stage 1. For example, the burners may be configured to produce a stable vortex flow.

A mixing space 6 may reside above the POX stage 1 and below the tubes 7 of the GHR stage 5. The mixing stage 6 may include sufficient volume for efficient mixing of the high temperature gases produced by the burner 5 and/or for sufficient residence time for the high temperature reactions such as the partial oxidation and shift reactions to take place. This may produce the maximum yield of synthesis gas with the required CO to H2 ratio while minimizing the production of solid carbon particles. The tubes 7 may be at least partially filled with a catalyst appropriate for the catalytic steam reformation of feed stream entering the GHR stage through GHR inlet 19. The tubes 7 are fixed into a tube sheet 7' at the cold end and have no fixing at the hot end allowing unrestricted expansion at operating temperature. The tubes 7 of the GHR stage 5 may include a restriction 9 (e.g., an outlet nozzle) to increase the gas discharge velocity. Increasing the gas discharge velocity may promote good mixing between the POX and GHR product gas streams. The mixing may also be promoted by arranging a perforated plate 8 in the combined gas flow stream (e.g., combined gas from the tubes 7 of the GHR stage 5 and the POX stage 1). The plate 8 is located above the outlet nozzles 9 of the GHR tubes 7. A particulate layer (e.g., particulate layer 560 in FIG. 5) may include solid granules or solid formed pellets 560 may be placed above the perforated plate. These granules or pellets may include an inert material such as alumina or silica, or other inert materials capable of withstanding the operating temperature. The granules or pellets may filter at least a portion of the carbon particles produced in the POX reactor to prevent excessive carryover to the GHR reactor. The carbon trapped on the surface of these granules or pellets will quickly react with excess steam present in the combined synthesis gas stream (e.g., at the operating temperatures of greater than 1000° C.), and this continuous removal of deposited solid carbon will inhibit blockage due to the solid carbon. In some implementations, the granules or pellets may include catalysts, such as catalysts to promote the water gas shift reaction. See eqn. (1). This may establish a close approach to equilibrium which will allow, under the high temperature conditions, conversion of part of the carbon dioxide present in the synthesis gas stream to carbon monoxide by exothermic reaction with hydrogen. This also may lower the synthesis gas temperature.

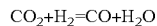

$$CO_2 + H_2 = CO + H_2O \qquad \text{(eqn (1))}$$

The tubes 7 of the GHR stage 5 may be coupled (e.g., affixed) to a tube sheet 7'. The tube sheet 7' may be supported on a support ring 10 that is coupled (e.g., welded) to the shell 11 of the POX stage 1 and GHR stage 5. The position of the GHR tube sheet 7' on the support ring 10 may be retained by coupling members 21 (e.g., studs, bolts, etc.).

A GHR feed stream, which may include steam and a portion of the hydrocarbon feed and/or CO2 may flow into the GHR stage 5 through a GHR inlet 19. The GHR inlet may include a flexible portion 24 to, for example, compensate for thermal expansion when the unit is at its operating temperature. The GHR stage 5 may include a header cover 20 proximate a top of a GHR stage. The header cover 20 may be coupled, off center, to a top flange of the GHR stage 5 using a coupling member 22 (e.g., studs, bolts, etc.) so that it covers (at least a portion of) the top section of the tube sheet 7' and covers all of the GHR tubes 7. The entire top section of the GHR tubes 7 may be covered by the header cover 20. An internal portion of the inlet nozzle 19 may be detached from the vessel wall 11 to facilitate the removal of the GHR top header 20 and/or allow access to each of the catalyst filled reactor tubes.

As illustrated, the GHR stage 5 includes a segmentally baffled shell side. The shell side of the GHR stage 5 has a segmental cut-out 12 in the tube sheet to allow the synthesis gas stream to pass out of the shell side of the GHR stage 5 into the space 13 below the WHB stage 14. The WHB stage 14 includes, coupled to the shell side, a boiler feed-water inlet pipe 15 (e.g., proximate the base of the WHB stage) and an outlet steam or steam plus water carryover pipe 16 (e.g., proximate the top of the WHB stage). The WHB stage 14 includes tubes for the passage of the total synthesis gas product stream in heat transfer contact with the evaporating water on the shell side. The WHB stage 14 includes a top cover 17 with a synthesis gas outlet pipe 18.

As illustrated, the GHR feed stream may be provided through GHR inlet 19 to the area 20', which is enclosed by the header cover. The GHR feed stream may flow from the area 20' enclosed by the header cover 20 into the tubes 7. The header cover may inhibit communication between the inlet feed in pipe 19 and the product gas in space 13. At least portions of the GHR feed stream may undergo catalytic steam reformation to produce synthesis gas. The product stream may exit through the nozzles 9 of the tubes 7 to mix with the gases from the POX stage of the combined synthesis gas generation system. This combined stream may flow through the perforated plate 8 to the shell side of the GHR stage to provide heat to the tubes for the catalytic steam reformation of the GHR feed stream in the tubes 7. By providing heat to the stream in the tubes 7, the combined gas stream may be cooled.

The cooling and heat transfer from the shell side synthesis gas flow may be enhanced by including regularly spaced horizontal baffles (e.g., vertically separated, which direct the shell side flow over the outside of the tubes 7 in an optimum manner consistent with constraints of pressure drop through the shell side of the GHR 5). As illustrated the baffles have segmental cutouts alternatively arranged to facilitate the flow of shell side gas from one baffle space to another. The baffle arrangement allows the cut-out in the tube sheet to coincide with baffle size and location relative to the tube bundle so that the shell side gas flow may exit though the tube sheet cut-out 12. In some implementations, a disc and doughnut baffle arrangement may be utilized. The cooled gas stream may exit the shell side of the GHR stage 5 at opening 12 to flow into the space 13 disposed between the WHB stage 14 and the GHR stage 5. The cooled gas stream may then flow into the tube side of the WHB stage 14 and provide heat to produce steam from the feed water from inlet 15, which may further cool the cooled combined gas stream. The produced steam or steam plus water may exit the shell side of the WHB at outlet 16. Part or all of the steam stream optionally with further processing which may include further heating could be provided to the GHR stage 5 and/or the POX stage 1. The further cooled combined synthesis gas stream may exit the WHB stage and/or the combined synthesis gas system at synthesis gas outlet 18.

In some implementations, the exposed metallic portions or portions thereof (e.g., exposed metallic portions including optionally the exposed surface of the WHB tube sheet) in the space 13 may include a protective coating 23 (e.g., the coating may be coated, the coating may be a top layer of the portions, the coating may be a removably coupled layer, etc.). The protective coating 23 may be substantially gas impermeable and/or be applied after the GHR stage 5 has been installed with header cover 20. The protective coating 23 may be removed if the GHR bundle needs to be replaced in the future. Protective insulation may at least partially cover the coupling members 21 and 22. The lower side of the GHR tube sheet 7', or at least portions thereof, may be coated with a gas impermeable coating 24. The coating 24 may allow the tube sheet to be constructed from a less expensive material than the GHR tubes 7 (e.g., the GHR tubes may include nickel alloys such as 693 or 617. The vessel wall in the POX stage 1 and GHR stage 5 may be internally insulated with an insulation layer 25. The insulation layer 25 may include a permanent ceramic insulation. The vessel shell in the region of the space 13 may be internally insulated with an insulation layer 26, which may include, in some implementations, a permanent ceramic insulation.

Although an implementation of a three-stage synthesis gas generation system is illustrated in FIG. 1, various components and/or features may be added, deleted, and or modified. For example, the stages may be arranged horizontally or obliquely. As another example, the POX stage may be positioned proximate the top of a synthesis gas generation system. The GHR stage may be positioned proximate (e.g., adjacent, below, etc.) the POX stage. with the WHB below the GHR stage. In this case nozzle 16 will be above nozzle 15 and proximate to tube sheet 27 The system may be arranged in a vertical or oblique configuration with the POX on top, followed by the GHR and with the WHB at the bottom. The vertical arrangement shown in FIG. 1 may allow the GHR tube bundle to be easily lifted out of the shell after removal of the waste heat boiler section. As another example, a pipe may be a conduit. In some implementations, other insulation layers 25 and/or 26 may include a different type of insulation. A cross-sectional area of a POX stage and a GHR stage may be approximately similar in size. In some implementations, the combined synthesis gas generation system may be a single pressurized vessel that includes three stages. As another example, the steam produced by the WHB stage may be combined with feed stream and/or provided to a preheater. The steam produced by the WHB stage may not be provided to a piping system external to the combined synthesis gas system, but rather provided internally to the POX stage and/or the GHR stage.

Figure 4:
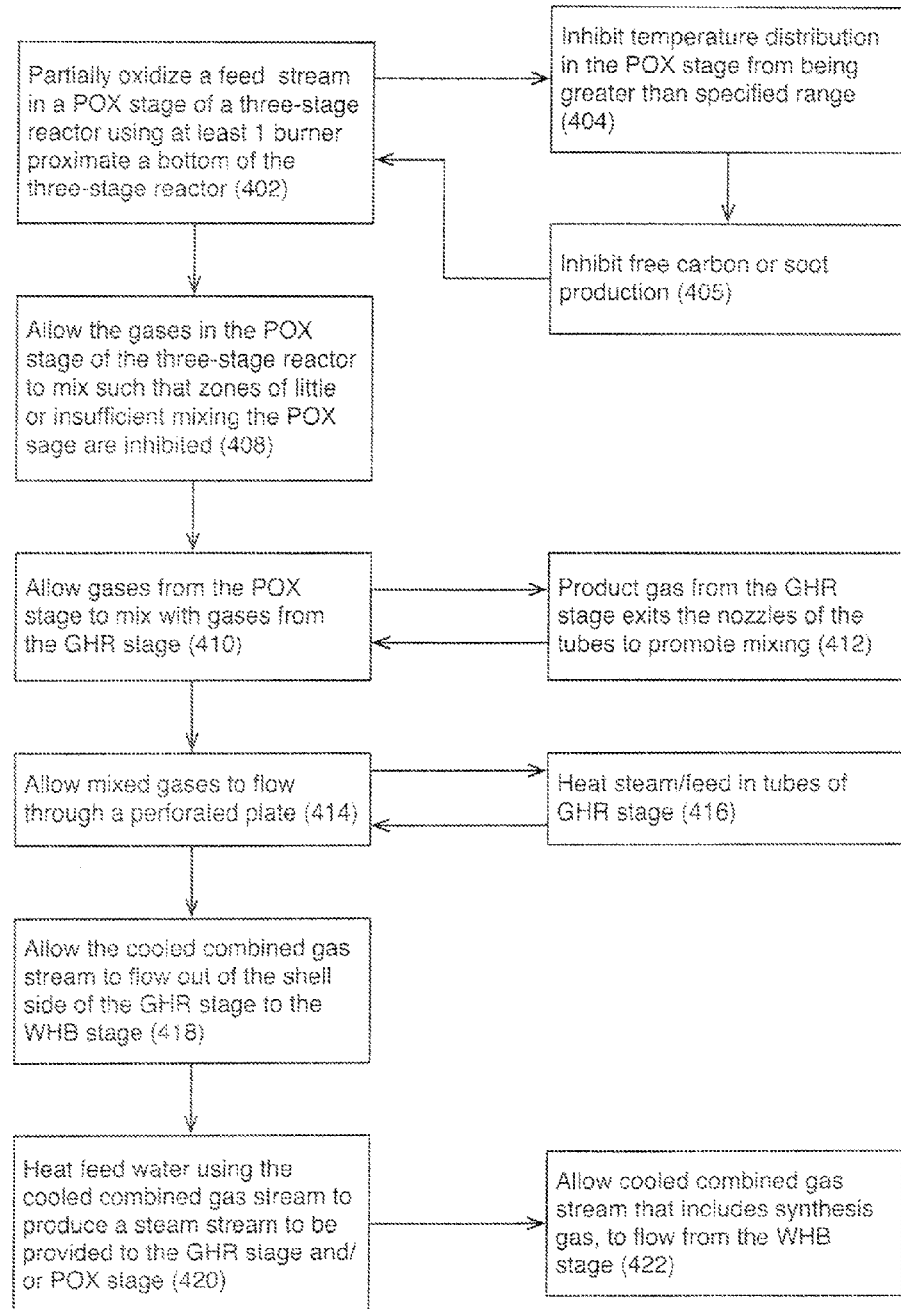
FIG. 4 illustrates a process of producing synthesis gas using the example system illustrated in FIG. 1.

FIG. 4 illustrates an example process for producing synthesis gas using a combined synthesis gas generation system, such as the combined synthesis gas generation system illustrated in FIG. 1. A feed stream may be partially oxidized in a partial oxidation stage of a three-stage reactor using at least one burner proximate a bottom of the three-stage reactor (operation 402). For example, a natural gas stream, an oxygen stream, and/or steam may be provided to a POX stage of a three-stage reactor. A temperature distribution in the POX stage greater than a specified range may be inhibited (operation 404). For example, the burner(s) of a POX may be designed to achieve a substantially even reaction temperature in the POX stage. Limiting zones of little or insignificant mixing may increase yields of synthesis gas, reduce costs of producing synthesis gas, and/or promote even reaction temperatures in the POX stage, for example. Free carbon and/or soot production may be inhibited (operation 406). For example, the burner(s) of the POX may be designed or selected such that free carbon or soot production is minimized.

The gases in the POX stage of the three-stage reactor may be allowed to mix (e.g., due to the flow pattern of the gases) such that zones of little or insignificant mixing in the POX stage are inhibited (operation 408). For example, the burners of the POX may be positioned such that zones of little or insignificant mixing is minimized or inhibited. A stable vortex flow in the POX stage may be produced to inhibit zones of little or insignificant mixing. The POX stage may have sufficient volume for efficient mixing of the high temperature gases produced by the burner to take place and for sufficient residence time for the high temperature reactions to take place, which may maximize the output of synthesis gas and minimize the production of solid carbon particles (e.g., zero or minimal carbon particle production).

The gases from the POX stage and the gases from the tubes of the GHR stage may be allowed to mix (operation 410). For example, the gases from the POX stage and the GHR stage may be allowed to mix in the mixing zone disposed between the tubes of the GHR and the POX stage. The gas from the tubes of the GHR may include synthesis gas produced by catalytic steam reformation of the feed stream and the steam stream and/or $CO_2$ stream entering the tubes of the GHR stage. Product gas from the GHR stage may exit from nozzles of the tubes to promote mixing between the gases from the POX and the tubes of the GHR (operation 412).

The combined gas stream may flow through a perforated plate (operation 414). For example, the combined gas stream may flow through a perforated plate positioned proximate the mixing zone to the shell side of the GHR stage. The perforated plate may support a particulate layer which can act as a carbon removal device and/or a catalytic section, to achieve equilibrium for the water gas shift reaction and/or cool the combined synthesis gas mixture. The shell side of the GHR may be baffled. Allowing the combined gas stream to flow through the perforated plate may impose a pressure drop across the perforated plate, which may cause a more even flow (e.g., when compared to flow without use of a perforated plate) across the perforated plate over a cross-section of the mixing space.

Steam and feed and/or $CO_2$ in the tubes of the GHR stage may be heated (operation 416). For example, the combined gas stream in the shell side of the GHR may provide heat to heat the stream in the tube side of the GHR stage.

The cooled combined gas stream may flow from the shell side of the GHR stage to the WHB stage (operation 418). The feed water to the WHB may be heated using the cooled gas to produce steam to be provided to the GHR stage and/or the POX stage (operation 420). Excess steam may be used for power production. The cooled combined gas stream may be further cooled by providing the heat to produce steam in the WHB. The cooled combined gas stream that includes synthesis gas may flow from the WHB (operation 422).

Process 400 may be implemented by various systems, such as system 100. In addition, various operations may be added, deleted, or modified. For example, in a two-stage combined synthesis gas reactor, operations 418, 420, and/or 422 may not be performed by the combined synthesis gas system. As another example, the steam stream produced may be provided to a pre-heater and/or mixed with a portion of a feed stream. In some implementation, the process 400, or portions thereof, may be performed by a two-stage reactor (e.g., a reactor that includes a POX stage and a GHR stage).

Figure 5:
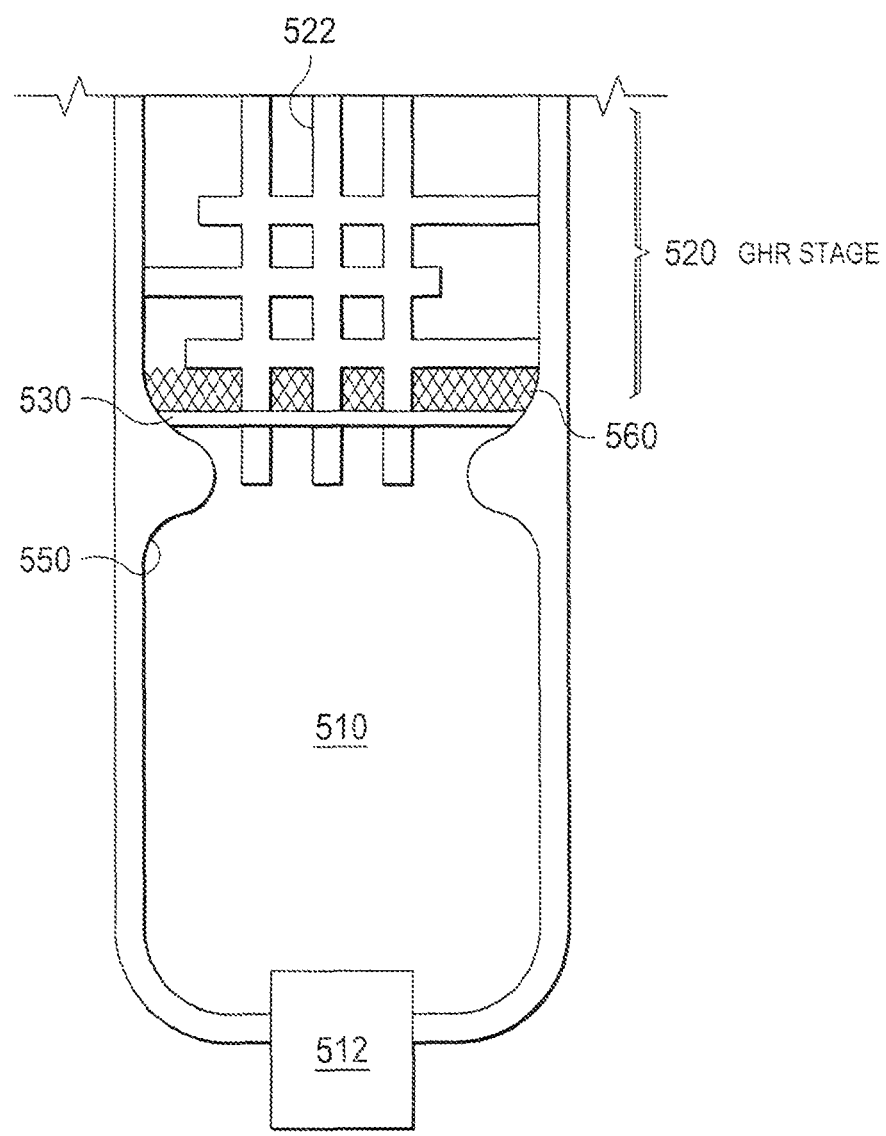
FIG. 5 illustrates a portion of an example combined synthesis gas generation system.

FIG. 5 illustrates a portion of an example synthesis gas generation system 500. As illustrated, the synthesis gas generation system 500 includes a two-stage reactor with an integrated POX stage 510 and GHR stage 520. A feed stream, oxygen stream, and/or steam stream may be provided to a burner 512 of the POX stage 510. The feed stream may be partially oxidized to produce synthesis gas. A feed stream and steam stream and/or $CO_2$ stream may be provided to the tube side of a GHR stage 520. In the tubes 522, which include a catalyst, at least a portion of the feed stream in the tubes may be catalytically steam reformed to produce synthesis gas. The gas stream from the tubes 522 optionally with nozzles 9 of the GHR stage 520 and the gases in the POX stage 510 may be mixed and allowed to flow through the perforated plate 530. The combined gas stream may flow through the perforated plate 530 and the particulate layer 560 to the shell side of the GHR stage. Heat from the combined gas stream may be provided to the stream in the tubes of the GHR stage. Allowing the heat from the combined gas stream to be utilized to heat the stream in the tubes of the GHR side may provide cost-savings and produce a higher yield of synthesis gas.

Figure 6:
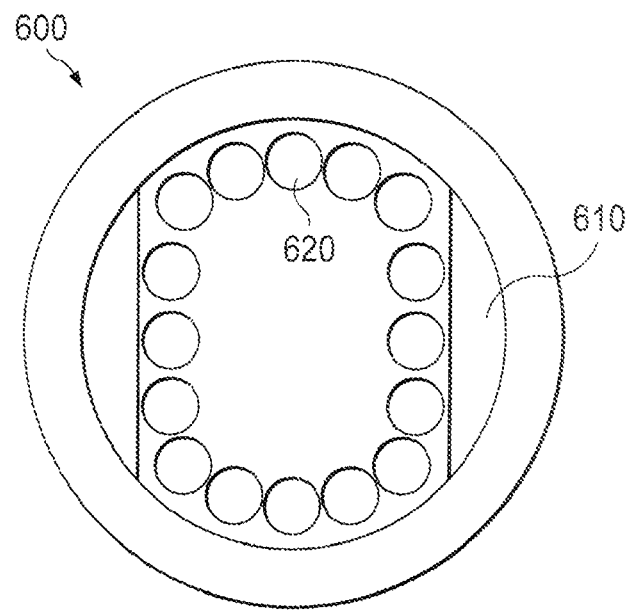
FIG. 6 illustrates an example cross-section of the example synthesis gas generation system illustrated in FIGS. 1, 2, and 5.
Figure 7:
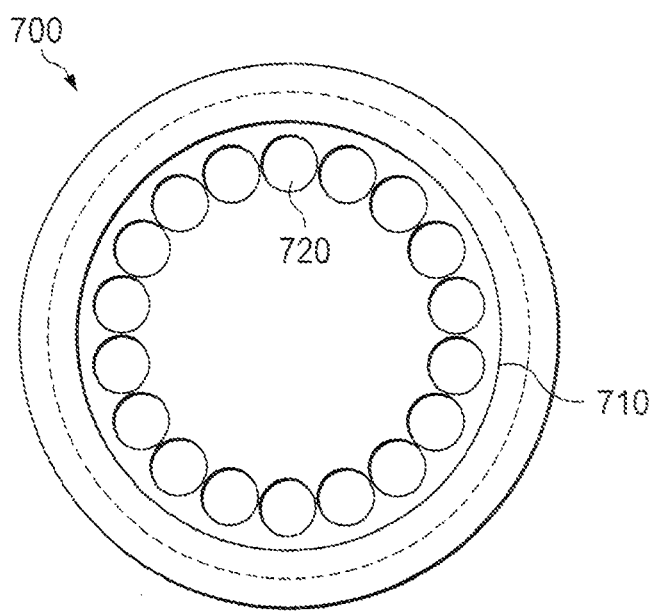
FIG. 7 illustrates an example cross-section of the example synthesis gas generation system illustrated in FIGS. 1, 2, and 5.

The shape of the top of the POX stage 510 may be such that the refractory internal vessel lining 550 is built up (e.g., so that protrusion(s) into a vessel cavity exist) and/or protrusions may be coupled to an internal area of the vessel so that the tubes 522 are approximately evenly distributed across the exit cross-section of the POX gas flow, as illustrated in FIGS. 5-7. FIG. 6 illustrates a cross-sectional view of a top portion 600 of a POX stage. As illustrated, two baffle segments 610 would be disposed proximate edges of the cross-section, assuming there were no tubes 620 through the baffle segments. As illustrated in FIG. 7, for a disc and doughnut shell side baffle arrangement GHR, a cross-section 700 of which is illustrated in FIG. 7, the segments 710 would be an annular ring and there may also be a circular empty area in the perforated plate 540 above the GHR outlet nozzles.

As illustrated in FIG. 5, a perforated plate 530 may be disposed proximate the ends of the GHR tube 522 (e.g., above the outlet nozzles 9 of the tubes). The GHR tubes may penetrate the perforated plate 530. The plate 530 may include apertures for the GHR tube penetrations and a second set of apertures, which may be smaller. The gas stream from the mixing zone may pass through the second set of apertures to the shell side of the GHR. The second set of apertures may cause a further pressure drop and/or ensure even flow over the cross-section of the POX/GHR mixing space. Above this perforated plate 530 and the particulate layer 560, the combined synthesis gas flow may be asymmetric as the gas flow enters the baffled heat exchange section.

Various implementations of the three-stage reactors and/or two-stage reactors may include one or more or none of the following features. A vessel cross-sectional area (e.g., diameter) between the POX and GHR stage may be similar or different. For example, the vessel may narrow between the POX stage and the GHR stage and/or through the GHR stage. As another example, the vessel may have an approximately consistent cross-sectional area across the length of the vessel. In some implementations, a shell side of the GHR stage may include a layer of packing material, such as an inert ceramic-shaped packing material, (e.g., in space 560 illustrated in FIG. 5). The packing may be disposed above the perforated plate and may trap carbon particles produced by the POX burner (e.g., carbon particles may be produced particularly during start-up of the system as it is being brought up to operating temperature). A feature of the system may be that when the system is operated at temperatures of above approximately nine hundred degrees Celsius, any carbon trapped on the packing layer will be gasified to CO and $H_2$ when reacted by reaction with steam.

Another feature of the system may be that the POX burner may be a single unit or multiple units each with a separate oxygen, feed, and/or steam inlets. The POX burner(s) may be disposed proximate the bottom head of the POX stage and fire vertically upwards. The burner(s) may be designed to promote back mixing of hot product synthesis gas into the high temperature primary oxygen/hydrocarbon reaction zone to ensure even reaction temperature range. The burner(s) may also be designed to minimize, inhibit, and/or eliminate free carbon or soot production by the burner.

Another feature of the system may include that recirculation may be caused by the burner design and may provide a discharge gas flow pattern which provides a stable vortex flow immediately above each burner. The stable vortex flow may provide a large recirculation gas flow pattern back into the reaction zone of the burner. In some implementations, there may be a minimum level of bulk recirculation flow in the main area of the POX stage. For example, greater than 90% of the POX synthesis gas may have a residence time of 4 seconds or more to allow time to maximize production of synthesis gas in the POX reactor.

Another feature of the system may include that the mixing of the GHR tubes outlet synthesis gas flow and the POX synthesis gas flow may be independent of the flow patterns in the POX burner system. Thus, the appropriate flow pattern for each mixing stage may be implemented. In some implementations, a primary mechanism for mixing the GHR outlet synthesis gas from each catalyst filled tube is through the use of a restriction nozzle proximate an end of each tube. The gas exiting the nozzle may have an average outlet velocity of at least approximately 20 meters/second and/or from approximately 30 to 80 meters/second. These high velocity gas streams may cause a majority of the surrounding gas to mix with the GHR synthesis gas product exiting the tubes.

Another feature of the system may include that the GHR reactor vessel stage may be arranged with GHR tubes in a baffled heat exchanger configuration using either a segmental baffle or a disc and doughnut arrangement of baffles.

Another feature of the system may include a concentric tube surrounding each of the GHR tubes 7 such that the combined synthesis gas leaving the layer 560 enters these concentric spaces and provides the heat required for the GHR reforming reactions. The concentric tubes can then terminate at the top baffle (either segmental or concentric) at the cold end of the GHR so that the combined synthesis gas stream can pass through the opening 12 into the space 13 between the GHR and the WHB.

Another feature of the system may include significant cost savings (e.g., decreasing piping requirements, decreased footprint, more efficient heat recovery and utilization, etc.). For example, in some implementations, piping is not required for the product gas streams (e.g., synthesis gas) to flow between multiple vessels. The piping required for separate vessels is commonly high temperature, internally insulated with large diameter high pressure external steel pipe which must be either water jacketed to keep the temperature constant or monitored for any possible local heating due to problems with the internal insulation. Reduction of the need for this type of expensive piping may decrease costs of set-up (e.g., due to easier installation, less piping required, etc.) and production of synthesis gas (e.g., since the expensive piping will not need to be monitored, repaired, or replaced). As another example, when utilizing a three separate vessels, a minimum vertical and a horizontal separation is required between the vessels (e.g., by government and/or industry standards, such as DOW Fire and Safety Standards) to accommodate the high temperature synthesis gas piping connections. This means that the three vessels are supported in an expensive steel framework with a significant cross-sectional area and height. A single vessel can be free-standing with adequate clearance for removal of the burners from the base of the vessel. No supporting steel structure may be necessary and/or significantly less supporting steel may be required when compared with systems that utilize separate vessels. In addition, the cost of a single unit is significantly less than three units. For example, there are two high-pressure vessel heads on a single unit, rather than six on three separate units. In addition, cost savings and time savings may be realized since one vessel coding and approval is required when utilizing a single unit, as opposed to three units or two units.

Another feature of the system includes that a single unit can be built as a modular fully fabricated, transportable assembly which may also include other upstream and downstream components at a much larger through-put than a three-vessel configuration. Another feature includes decreased risk of refractory failure, since the refractory arrangement, location and quantity may be more favorable than a design with internally insulated interconnecting piping.

Another feature of the system may include that approximately the same or a fewer number of significant problems are associated with starting up and operating with a single vessel. In fact, fewer problems may be associated with a single vessel when compared to two or three separate units, since in practice the entire three-vessel synthesis gas train must be started up, shut down and operated as a single unit with no isolation valves between the three units. Another feature may be that sensors to monitor plant performance may be easily positioned within the single vessel envelope. Furthermore, maintenance and inspection may be facilitated in the single-vessel configuration, when compared with maintaining and inspecting multiple units.

Another feature may include the stable vortex mixing of the POX stage. For example, the systems described in U.S. Pat. No. 4,741,885 include a swirling arrangement of POX burners along a length of a vessel to induce a vortex flow with an upward central component which has a cross-section corresponding to the cross-section of the tube area in the GHR. The use of multiple burners arranged tangentially around the periphery of the POX section and inclined at an angle to the radial axis at each burner position and also inclined upwards cause an upward swirling motion to be induced in the cavity of the POX stage. However, dead zones, or areas with insignificant mixing, or flow velocities, will occur. The dead zones may cause an uneven reaction temperature profile in the POX stage and/or decreased yield of synthesis gas. In addition, the system described in U.S. Pat. No. 4,741,885 cause a pressure differential across the unit. This pressure differential is highly undesirable. A further disadvantage is that the vortex formation is in the whole body of the POX space and serves to induce synthesis gas product at lower temperature to be drawn down into the POX space, thus locally lowering the POX space temperature and preventing the maximum conversion of the POX burner gases to synthesis gas due to the variation in temperature and residence time caused by this arrangement.

Although streams have been described to include various components in the implementations, the streams may include one or more other components. For example, although the feed stream is described as including methane, the feed stream may include other components such as other hydrocarbons (e.g., ethane, propane, butane, pentane, etc.), other carbon-containing compounds (e.g., carbon dioxide, carbon monoxide, alcohols, etc.), organic compounds, sulfur containing compounds (e.g., organic sulfur compounds, hydrogen sulfide, etc.), nitrogen, argon, etc. The feed stream may be natural gas, gases associated with the production of crude oil, combustible off-gasses from other processes such as refinery operations, liquid hydrocarbons, etc. In some implementations, when the feed stream may be processed natural gas, for example, the sulfur compounds in natural gas may be removed or at least partially removed to prevent catalyst damage, particularly in the GHR. As another example, although the synthesis gas is described as including carbon monoxide and hydrogen, the synthesis gas may also include other components, such as inert gases (e.g., nitrogen or argon). As another example, an oxygen stream may include inert gases or nitrogen, in addition to oxygen.

Although streams are described as gas streams or including gases, other forms of matter may also exist in the streams. For example, the stream may include liquid. As an example, streams in the WHB stage may include water and steam or a liquid hydrocarbon may be used as a feed stream to the POX burner.

Although various features are described in conjunction with a description of the two-stage reactor or three-stage reactor, various features may apply to either.

Although pipes are described in various implementations, other conduits may be utilized as appropriate. Although vessels are described in various implementations, other types of containers (e.g., various shapes and designs) may be utilized as appropriate. Although a specific implementation of the system is described above, various components may be added, deleted, and/or modified. In addition, the various temperatures and/or concentrations are described for exemplary purposes. Temperatures and/or concentrations may vary, as appropriate.

A number of implementations have been described. Nevertheless, it will be understood that various modifications may be made without departing from the spirit and scope of the implementations. Accordingly, other implementations are within the scope of this application.

It is to be understood the implementations are not limited to particular systems or processes described which may, of course, vary. It is also to be understood that the terminology used herein is for the purpose of describing particular implementations only, and is not intended to be limiting. As used in this specification, the singular forms "a", "an" and "the" include plural referents unless the content clearly indicates otherwise. Thus, for example, reference to "a stream" includes a combination of two or more streams and reference to "a feed" includes different types of feeds.

What is claimed is:

1. A single pressure vessel for producing syngas containing at least hydrogen and carbon monoxide, comprising:
a partial oxidation (POX) reactor located proximate a first end of the single pressure vessel and including a POX reaction zone formed by a portion of the POX reactor, wherein the POX reaction zone exothermically reacts a first portion of a hydrocarbon feed stream with an oxidant gas comprising molecular oxygen and optionally steam and carbon dioxide in a first reactor to produce an exothermically-generated syngas product, wherein the feed stream includes methane;
a gas heated reformer (GHR) located between the POX and a waste heat boiler (WHB) and including a GHR reaction zone formed by a portion of the GHR, wherein the GHR reaction zone endothermically reforms a second portion of the hydrocarbon feed stream with steam and optionally carbon dioxide over a catalyst in a heat exchange reformer to produce an endothermically-reformed syngas product, wherein heat used in generation of the endothermically-reformed syngas product is derived from heat released by cooling the combined stream of the product syngas from the POX and the GHR;

a mixing space formed by a portion of the signal pressure vessel, located between the POX reactor and the GHR, and configured to receive syngas from the POX reactor and syngas from the GHR to produce a cooled combined syngas stream;

the WHB located proximate a second end of the single pressure vessel and configured to generate steam using heat derived by further cooling the cooled combined syngas stream from the mixing space; and wherein the POX, GHR and the WHB are contained in the single pressure vessel independent of piping between the POX, the GHR, and the WHB.

2. The system of claim 1, wherein the POX, the GHR, and the WHB are arranged vertically with the POX positioned below the GHR and the WHB positioned above the GHR.

3. The system of claim 1, wherein the POX comprises a POX burner with a first inlet for a feed stream and a second feed for an oxygen stream and optionally a steam stream and a carbon dioxide stream and configured to inhibit zones of insignificant mixing and provide a uniform residence time for gases produced in the POX.

4. The system of claim 1, further comprising a mixing stage between the POX and the GHR for mixing of the syngas product produced from the POX and the GHR such that combined gas streams entering the shell side of the GHR is at a substantially uniform temperature.

5. The system of claim 1 wherein an internal arrangement of the GHR includes a tube sheet in which GHR tubes include an opening through which a total syngas flow can pass isolated from a total GHR feed stream through a cover secured to and covering a part of the tube sheet in which the GHR tubes are secured.

6. The system of claim 1, wherein the GHR comprises a GHR inlet for a total feed stream including flexible members that compensate for thermal expansion.

7. The system of claim 1, further comprising an internal connection between a total GHR feed gas inlet nozzle and a GHR tube sheet cover can be removed to expose GHR tubes.

8. The system of claim 1, wherein a GHR bundle can be removed from a pressure vessel by removing the WHB to expose the GHR.

9. The system of claim 1, wherein each of the GHR tubes includes a restriction such as a nozzle on an outlet end to increase a GHR syngas discharge velocity and located at least proximate a mixing area between the POX and the GHR.

10. The system of claim 1, wherein the GHR comprises a perforated plate located above outlet restrictions of the GHR tubes through which a total syngas product flows having holes for the tubes to pass through and holes for a total syngas to pass through sized to promote mixing of the total syngas product.

11. The system of claim 1, wherein a layer of solid particles is placed above a perforated plate to trap carbon particles in the total syngas product stream and to enable sufficient residence time for a reaction of the deposited carbon and steam present in the total syngas product stream.

12. The system of claim 11, wherein the solid particles include a catalyst for a carbon monoxide shift reaction to reduce a temperature of the total syngas product stream and reduce a carbon monoxide to hydrogen ratio in the total syngas product stream.

13. The system according to claim 1, wherein exposed metallic surfaces in a space between the GHR and the WHB and on an underside of the GHR tube sheet are coated with a layer of material substantially impervious to diffusion of carbon monoxide under operating conditions.

14. A system according to claim 1, wherein an internal wall of the pressure vessel in an areas of the POX and GHR and the space between the GHR and the WHB are internally insulated by a suitable refractory insulation.

15. A system according to claim 1, wherein the GHR tubes are fabricated from a material substantially resistant to metal dusting caused by exposure to the total syngas product stream.

* * * * *